Patented Apr. 6, 1943

2,315,498

UNITED STATES PATENT OFFICE 2,315,498

POLYMETHINE DYE INTERMEDIATE AND PROCESS OF PREPARATION

Leslie G. S. Brooker and Grafton H. Keyes, Rochester, N. Y., assignors to Eastman Kodak Company, Rochester, N. Y., a corporation of New Jersey No Drawing. Application November 8, 1940, Serial No. 364,906. In Great Britain December 15, 1939

19 Claims. (Cl. 260—304)

This invention relates to a process for preparing polymethine dye intermediates and to polymethine dye intermediates obtainable thereby.

A class of intermediates of value in the preparation of symmetrical and unsymmetrical carbocyanine dyes is that containing such alkylmercapto substances as the following:

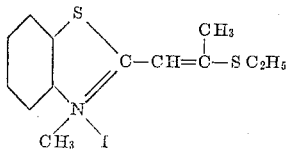

which can be prepared by treating 2-methylbenzothiazole methiodide with ethylisothioacetanilide, in the presence of acetic anhydride. However, the above intermediate and other similar intermediates are always contaminated with symmetrical carbocyanine dyes to a greater or lesser extent, owing to condensation of the intermediate, as it forms, with the cyclammonium quaternary salt, such as 2-methylbenzothiazole methiodide, which is present as a starting material.

We have now found a new method for preparing such alkylmercapto intermediates, whereby the intermediate is obtained free from contamination with dyes. Moreover, by our new method aralkyl and arylmercapto intermediates of the same type are made available for the first time.

It is, accordingly, an object of our invention to provide a process for preparing dye intermediates. A further object is to provide new dye intermediates. Other objects will become apparent hereinafter.

In accordance with our invention, we condense a mercaptan with a halogenovinyl compound, such as described in the copending application of L. G. S. Brooker and F. L. White, Serial No. 330,580, filed April 19, 1940 (now United States Patent 2,231,659, dated February 11, 1941), and such as comes under the following general formula:

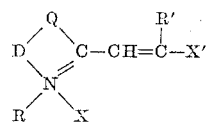

wherein D represents a divalent organic radical, such as phenylene or naphthylene, Q represents a divalent atom, such as sulfur or selenium, R represents a monovalent organic radical, such as an alkyl or an aryl group, R' represents a monovalent organic radical, such as an alkyl or an aryl group, X represents an acid radical, X' represents halogen.

The condensations are advantageously effected in the presence of an acid-binding agent. Strong tertiary organic bases, i. e. tertiary organic bases having dissociation constants substantially greater than that of pyridine, are especially suitable. Trialkylamines, and N-alkylpiperidine are exemplary of such tertiary bases. The tertiary base is advantageously employed in alcohol or in pyridine solution. Heat accelerates the formation of the intermediates.

The chlorovinyl derivatives are advantageously employed. Typical mercaptans which can be employed in practicing our invention include aliphatic mercaptans, such as butyl and benzyl mercaptan, and aromatic mercaptans, such as phenyl and naphthyl mercaptans.

The following examples will serve to illustrate the preparation of dye intermediates, in accordance with our process EXAMPLE 1.— 2 - (2-benzylmercaptopropenyl) -β-naphthothiazole ethiodide

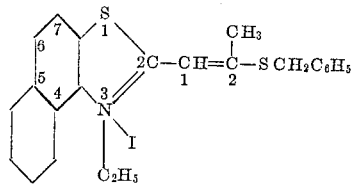

6 g. (1 mol.) of 2-(chloropropenyl)-β-naphthothiazole ethochloride and 2.3 g. (1 mol.) of benzyl mercaptan were placed in 10 cc. of absolute ethyl alcohol containing 1.87 g. (1 mol.) of triethylamine. The mixture was boiled, under reflux, for 15 minutes. The mixture was cooled, and then diluted with 150 cc. of diethyl ether, in order to precipitate the intermediate. The intermediate was collected on a filter and washed with diethyl ether. The crude product was dissolved in 5 cc. of hot methyl alcohol, and the resulting hot solution was treated with an excess of sodium iodide in warm methyl alcohol solution. The intermediate precipitated as the iodide. It was filtered off (21% crude yield) and twice recrystallized from ethyl alcohol. It was obtained as dull yellow crystals, melting at 178° to 179° C.

EXAMPLE 2.—2-(2-benzylmercaptostyryl)-β-naphthothiazole ethochloride

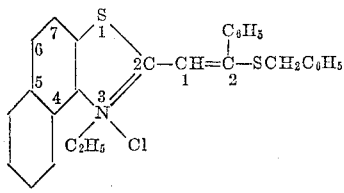

The 2-(2-chlorostyryl)-β-naphthothiazole ethochloride obtained from 6.6 g. (1 mol.) of 1-ethyl-2-benzoylmethylene-β-naphtholthiazoline by reaction, in dry benzene, with phosphorous oxychloride, was dissolved in 20 cc. of absolute ethyl alcohol. 2.5 g. (1 mol.) of benzyl mercaptan and 2 g. (1 mol.) of triethylamine were added to the solution. The resulting mixture was boiled, under reflux, for 10 minutes. The mixture was then chilled to 0° C. when the intermediate precipitated. It was collected on a filter, washed with 20 cc. of acetone and dried in the air. The yield was 5.2 g. (61%). After two recrystallizations from methyl alcohol, the intermediate was obtained as yellow crystals, melting at 193° to 196° C. with decomposition.

EXAMPLE 3.—5-chloro-2-(2-phenylmercaptobutenyl)-benzoselenazole ethiodide

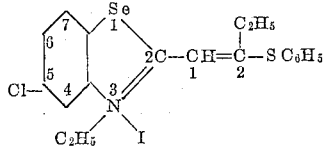

The 5-chloro-2-(2-chlorobutenyl)-benzoselenazole ethochloride which was obtained from 4.7 g. (1 mol.) of 5-chloro-3-ethyl-2-propionylmethylene-benzoselenazoline by reaction, in dry benzene, with phosphorous oxychloride, was placed in 10 cc. of absolute ethyl alcohol. To the resulting mixture were added 1.2 g. (1 mol.) of thiophenol and 1.5 g. (1 mol.) of triethylamine. The mixture was boiled, under reflux, for 5 minutes. The reaction mixture was then chilled to 0° C. and the intermediate was precipitated by the addition of 100 cc. of diethyl ether. After decanting the liquors, the precipitate was dissolved in 10 cc. of methyl alcohol. To this solution was added an excess of sodium iodide dissolved in methyl alcohol. Upon chilling the resulting solution to 0° C., the intermediate separated as the iodide. It was collected on a filter, washed with water (10 cc.), acetone (30 cc.) and finally dried in the air. The yield was 2.9 g. (36%). After two recrystallizations from methyl alcohol, the intermediate was obtained as brownish crystals, melting at 195° to 197° C. with decomposition.

EXAMPLE 4.—2-(2-phenylmercaptopropenyl)-benzothiazole ethiodide

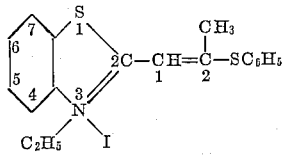

4.4 g. (1 mol.) of 2-acetylmethylene-3-ethylbenzothiazoline were suspended in 50 cc. of dry benzene. To this suspension were added 4.6 g. (1.5 mol.) of phosphorous oxychloride. After stirring the resulting mixture for about 10 minutes, the chlorovinyl compound separated as a solid. It was collected on a filter and then placed in 15 cc. of absolute ethyl alcohol. To the resulting mixture were added 1.6 g. (1 mol.) of thiophenol and 2 g. of triethylamine. The mixture was boiled, under reflux, for 5 minutes. The mixture was then cooled and diluted with 100 cc. of diethyl ether, whereupon the dye intermediate precipitated. The liquors were decanted, and the precipitate was dissolved in 10 cc. of methyl alcohol. To this solution was added an excess of sodium iodide in methyl alcohol solution. Upon chilling the resulting solution, the intermediate separated out as the iodide. It was collected on a filter, washed with water (25 cc.), acetone (25 cc.) and dried in the air. The yield was 3.1 g. (35%). After two recrystallizations from methyl alcohol, it was obtained as brownish yellow crystals, melting at 191° to 193° C. with decomposition.

In a manner similar to that illustrated in the above examples 2-(2-phenylmercaptobutenyl)-benzothiazole pheniodide can be prepared from 2-(2-chlorobutenyl)-benzothiazole phenochloride. 2-(2-chlorobutenyl)-benzothiazole phenochloride can be prepared by treating 3-phenyl-2-propionylmethylene-benzothiazoline with phosphorus oxychloride as described in Example 5 of our copending application Serial No. 356,656, filed September 13, 1940. 3-phenyl-2-propionylmethylenebenzothiazoline can be prepared by treating 2-methyl-3-phenylbenzothiazolium iodide with propionyl chloride as also described in Example 5 of our above referred to copending application. 2-methyl-3-phenylbenzothiazolium iodide can be prepared by oxidizing thioacetyl-diphenylamine with iodine as described in the copending application of Leslie G. S. Brooker and Homer W. J. Cressman Serial No. 353,502, filed August 21, 1940.

Our new dye intermediates can be employed to prepare chain-substituted merocarbocyanine dyes by condensing the intermediates with ketomethylene compounds, such as rhodanines, pyrazolones, 2-thio-2,4 (3,5)-oxazolediones, 2-thiohydantoins and the like. The condensations are advantageously effected in the presence of an acid-binding agent. Strong tertiary organic bases, i. e. tertiary organic bases having a dissociation constant substantially greater than that of pyridine, are advantageously employed. Trialkylamines and N-alkylpiperidines are examples of such strong bases. The following examples will serve to illustrate the formation of merocarbocyanine dyes according to our new process.

EXAMPLE 5.—3-ethyl-5(1-ethyl-2(3)-β-naphthothiazolylidene-isopropylidene) rhodanine 2.35 g. (1 mol.) of 2-(2-methylmercaptopropenyl)-β-naphthothiazole etho-p-toluenesulfonate (formed from the interaction of equivalent amounts of 1-ethyl-2-thioacetylmethylene-β-naphthothiazoline and methyl-p-toluenesulfonate (see our copending application Serial No. 356,656, filed September 13, 1940) or an equivalent amount of 2-(2-benzylmercaptopropenyl)-β-naphthothiazole ethiodide, and 0.8 g. (1 mol.) of 3-ethylrhodanine were placed in 30 cc. of absolute ethyl alcohol containing 1 g. (2 mol.) of triethylamine. The mixture was boiled, under reflux, for 15 minutes. The dye which formed was filtered off and washed with methyl alcohol. The yield was 1.4 g. (70%). After two recrystallizations from glacial acetic acid the dye was obtained as minute greenish needles, melting at 247° to 249° C. with decomposition.

EXAMPLE 6.—*3-ethyl-5-[(3-ethyl-2(3)-benzothiazolylidene)-isopropylidene] - 2-thio-2,4(3,5)-oxazoledione*

4.2 g. (1 mol.) of 2-(2-methylmercaptopropenyl) benzothiazole etho-p - toluenesulfonate (formed by the interaction of equivalent amounts of 3-ethyl-2-thioacetylmethylene benzothiazoline and ethyl-p-toluenesulfonate (see our copending application Serial No. 356,656, filed September 13, 1940), or an equivalent amount of 2-(2 - phenylmercaptopropenyl) - benzothiazole ethiodide, and 1.45 g. (1 mol.) of 3-ethyl-2,4(3,5)-oxazoledione were placed in 20 cc. of absolute ethyl alcohol containing 1 g. (2 mol.) of triethylamine. The mixture was boiled, under reflux, for 15 minutes. The dye which formed was collected on a filter and washed with methyl alcohol. After recrystallization from glacial acetic acid, it was obtained as brick red needles, melting at 207° to 209° C., with decomposition.

EXAMPLE 7.—*3-ethyl-5-[2-(3-ethyl-2(3)-benzothiazolylidene)-1-phenylethylidene] - 1 - phenyl-2-thiohydantoin*

The 2-(2-methylmercaptostyryl)-benzothiazole etho-p-toluenesulfonate obtained by heating together 3 g. (1 mol.) of 3-ethyl-2-thiobenzoylmethylenebenzothiazoline and 1.9 g. (1 mol.) of methyl-p-toluenesulfonate on a steam bath for 30 minutes (or an equivalent quantity of 2-(2-phenylmercaptostyryl)-benzothiazole ethiodide) was dissolved in 20 cc. of absolute ethyl alcohol. To this solution were added 2.2 g. (1 mol.) of 3-ethyl-1-phenyl-2-thiohydantoin and 2 g. (2 mol.) of triethylamine. The resulting mixture was boiled, under reflux, on a steam bath for 15 minutes. The resulting deep reddish solution was chilled to 0° C. The dye which separated was collected on a filter, washed with 50 cc. of water, then with 50 cc. of methyl alcohol and finally dried in the air. The yield was 71%. After two recrystallizations from a mixture of pyridine and methyl alcohol, the dye was obtained as reddish needles, having a greenish reflex and melting at 232° to 234° with decomposition.

EXAMPLE 8.—*2-diphenylamino - 5 - [2-(3-ethyl-2(3) - benzothiazolylidene) - 1 - phenylethylidene]-4(5)-thiazolone*

The 2-(2-methylmercaptostyryl)-benzothiazole etho-p-toluenesulfonate obtained by heating together 3 g. (1 mol.) of 3-ethyl-2-thiobenzoylmethylene benzothiazoline and 1.9 g. (1 mol.) of methyl-p-toluenesulfonate on a steam bath for 30 minutes (or an equivalent quantity of 2-(2-phenylmercaptostyryl)-benzothiazole ethiodide) was dissolved in 20 cc. of absolute ethyl alcohol. To this solution were added 2.7 g. (1 mol.) of diphenylamino-4(5)-thiazolone and 2 g. (2 mol.) of triethylamine. The mixture was boiled, under reflux, on a steam bath for 15 minutes. The dye which separated was filtered off, washed with 50 cc. of water, then with 50 cc. of methyl alcohol and finally dried in the air. The yield was 75%. The dye was obtained as reddish prisms having a greenish reflex and melting at 259° to 261° C. with decomposition, after it had been twice recrystallized from a mixture of methyl alcohol and pyridine.

Our new dye intermediates can also be condensed with primary or secondary aliphatic or aromatic amines, such as butyl amine, aniline, methylaniline, piperidine or morpholine, to give chain-sustituted hemicarbocyanine dyes. These chain-substituted hemicarbocyanine dyes can be condensed with cyclammonium quaternary salts containing a reactive methyl group, in the presence of an acid-binding agent, to give carbocyanine dyes.

What we claim as our invention and desire to be secured by Letters Patent of the United States is:

1. A process for preparing a polymethine dye intermediate comprising condensing a mercaptan with a cyclammonium quaternary salt containing a halogenovinyl group.

2. A process for preparing a polymethine dye intermediate comprising condensing, in the presence of an acid-binding agent, a mercaptan with a cyclammonium quaternary salt containing a halogenovinyl group.

3. A process for preparing a polymethine dye intermediate comprising condensing, in the presence of a tertiary organic base having a dissociation constant substantially greater than that of pyridine, a mercaptan with a cyclammonium quaternary salt containing a halogenovinyl group.

4. A process for preparing a polymethine dye intermediate comprising condensing a mercaptan with a halogenovinyl compound of the following general formula:

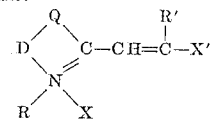

wherein D represents a divalent organic radical selected from the group consisting of phenylene and naphthylene groups, Q represents a divalent atom selected from the group consisting of sulfur and selenium atoms, R and R' each represent monovalent organic radicals selected from the group consisting of alkyl and aryl radicals, X represents an acid radical and X' represents halogen.

5. A process for preparing a polymethine dye intermediate comprising condensing, in the presence of an acid-binding agent, a mercaptan with a halogenovinyl compound of the following general formula:

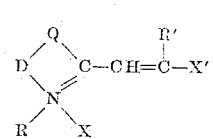

wherein D represents a divalent organic radical selected from the group consisting of phenylene and naphthylene groups, Q represents a divalent atom selected from the group consisting of sulfur and selenium atoms, R and R' each represent monovalent organic radicals selected from the group consisting of alkyl and aryl radicals, X represents an acid radical and X' represents halogen.

6. A process for preparing a polymethine dye intermediate comprising condensing, in the presence of a tertiary organic base having a dissociation constant substantially greater than that of pyridine, a mercaptan with a halogenovinyl compound of the following general formula:

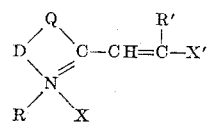

wherein D represents a divalent organic radical selected from the group consisting of phenylene and naphthylene groups, Q represents a divalent atom selected from the group consisting of sulfur and selenium atoms, R and R' represent monovalent organic radicals selected from the group consisting of alkyl and aryl radicals, X represents an acid radical and X' represents halogen.

7. A process for preparing a polymethine dye intermediate comprising condensing, in the presence of a tertiary organic base having a dissociation constant substantially greater than that of pyridine, a mercaptan with a naphthothiazole quaternary salt containing in the 2-position a halogenovinyl group of the following general formula:

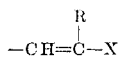

wherein R represents a monovalent organic radical selected from the group consisting of alkyl and aryl groups, and X represents halogen.

8. A process for preparing a polymethine dye intermediate comprising condensing, in the presence of a tertiary organic base having a dissociation constant substantially greater than that of pyridine, a mercaptan with a benzoselenazole quaternary salt containing in the 2-position a halogenovinyl group of the following general formula:

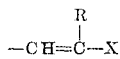

wherein R represents a monovalent organic radical selected from the group consisting of alkyl and aryl groups, and X represents halogen.

9. A process for preparing a polymethine dye intermediate comprising condensing, in the presence of a tertiary organic base having a dissociation constant substantially greater than that of pyridine, a mercaptan with a benzothiazole quaternary salt containing in the 2-position, a halogenovinyl group of the following general formula:

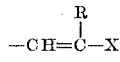

wherein R represents a monovalent organic radical selected from the group consisting of alkyl and aryl groups, and X represents halogen.

10. A process for preparing a polymethine dye intermediate comprising condensing, in the presence of an acid-binding agent, a mercaptan with a naphthothiazole quaternary salt containing in the 2-position, a halogenovinyl group of the following general formula:

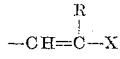

wherein R represents a monovalent organic radical selected from the group consisting of alkyl and aryl groups, and X represents halogen.

11. A process for preparing a polymethine dye intermediate comprising condensing, in the presence of an acid-binding agent, a mercaptan with a benzoselenazole quaternary salt containing in the 2-position, a halogenovinyl group of the following general formula:

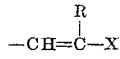

wherein R represents a monovalent organic radical selected from the group consisting of alkyl and aryl groups, and X represents halogen.

12. A process for preparing a polymethine dye intermediate comprising condensing, in the presence of an acid-binding agent, a mercaptan with benzothiazole quaternary salt containing in the 2-position, a halogenovinyl group of the following general formula:

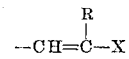

wherein R represents a monovalent organic radical selected from the group consisting of alkyl and aryl groups, and X represents halogen.

13. A process for preparing a polymethine dye intermediate comprising condensing, in the presence of a tertiary organic base having a dissociation constant substantially greater than that of pyridine, a mercaptan with a naphthothiazole alkyl chloride having in the 2-position a chlorovinyl group of the following general formula:

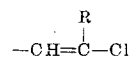

wherein R represents an alkyl group.

14. A process for preparing a polymethine dye intermediate comprising condensing, in the presence of a tertiary organic base having a dissociation constant substantially greater than that of pyridine, a mercaptan with a benzoselenazole alkyl chloride having in the 2-position a chlorovinyl group of the following general formula:

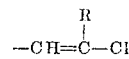

wherein R represents an alkyl group.

15. A process for preparing a polymethine dye intermediate comprising condensing, in the presence of a tertiary organic base having a dissociation constant substantially greater than that of pyridine, a mercaptan with a benzothiazole alkyl chloride having in the 2-position a chlorovinyl group of the following general formula:

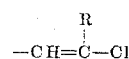

wherein R represents an alkyl group.

16. A polymethine dye intermediate of the following general formula:

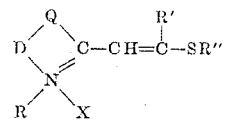

wherein D represents a divalent organic radical selected from the group consisting of phenylene and naphthylene groups, Q represents a divalent atom selected from the group consisting of sulfur and selenium atoms, R and R' each represent monovalent organic radicals selected from the group consisting of alkyl and aryl groups, R'' represents an aryl group, and X represents an acid radical.

17. A polymethine dye intermediate of the following general formula:

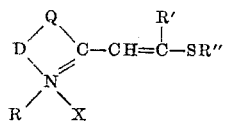

wherein D represents a phenylene group, R and

R' each represent alkyl groups, R'' represents an aryl group and X represents an acid radical.

18. A polymethine dye intermediate of the following general formula:

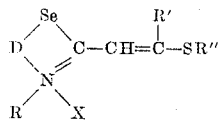

wherein D represents a phenylene group, R and R' each represent an alkyl group, R'' represents an aryl group and X represents an acid radical.

19. A polymethine dye intermediate of the following general formula:

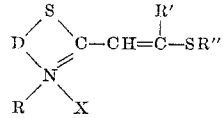

wherein D represents a phenylene group, R and R' each represent alkyl groups, R'' represents an aryl group and X represents an acid radical.

LESLIE G. S. BROOKER.
GRAFTON H. KEYES.

CERTIFICATE OF CORRECTION.

Patent No. 2,315,498.　　　　　　　　　　　　　　April 6, 1943.

LESLIE G. S. BROOKER, ET AL.

It is hereby certified that error appears in the printed specification of the above numbered patent requiring correction as follows: Page 4, second column, line 75, claim 17, for "phenylene" read --naphthylene--; and that the said Letters Patent should be read with this correction therein that the same may conform to the record of the case in the Patent Office.

Signed and sealed this 3rd day of August, A. D. 1943.

(Seal)

Henry Van Arsdale,
Acting Commissioner of Patents.